(12) United States Patent
Olson et al.

(10) Patent No.: US 8,122,283 B2
(45) Date of Patent: Feb. 21, 2012

(54) COMMUNICATIONS PATH STATUS DETECTION SYSTEM

(75) Inventors: Erik Olson, Seattle, WA (US); David Thompson, Shoreline, WA (US)

(73) Assignee: Padcom Holdings Inc., Bethlehem, PA (US)

( * ) Notice: Subject to any disclaimer, the term of this patent is extended or adjusted under 35 U.S.C. 154(b) by 204 days.

(21) Appl. No.: 12/437,413

(22) Filed: May 7, 2009

(65) Prior Publication Data

US 2009/0307522 A1    Dec. 10, 2009

(51) Int. Cl.
*G06F 11/00* (2006.01)
(52) U.S. Cl. .......................... 714/4.11; 714/4.1
(58) Field of Classification Search .................. 714/4.1, 714/4.12, 4.11, 4.2, 4.21, 4.3, 4.4, 4.5
See application file for complete search history.

(56) References Cited

U.S. PATENT DOCUMENTS

| | | | |
|---|---|---|---|
| 5,717,737 A | 2/1998 | Doviak et al. | |
| 6,198,920 B1 | 3/2001 | Doviak et al. | |
| 6,418,324 B1 | 7/2002 | Doviak et al. | |
| 6,546,425 B1 | 4/2003 | Hanson et al. | |
| 6,826,405 B2 | 11/2004 | Doviak et al. | |
| 6,981,047 B2 | 12/2005 | Hanson et al. | |
| 7,136,645 B2 | 11/2006 | Hanson et al. | |
| 7,293,107 B1 | 11/2007 | Hanson et al. | |
| 7,818,408 B1 * | 10/2010 | Ignatuk et al. | 709/221 |
| 2004/0059822 A1 * | 3/2004 | Jiang et al. | 709/230 |
| 2006/0126613 A1 * | 6/2006 | Zweig | 370/389 |
| 2008/0114872 A1 * | 5/2008 | Fisher et al. | 709/224 |
| 2009/0119536 A1 * | 5/2009 | Guo et al. | 714/4 |

* cited by examiner

*Primary Examiner* — Dieu-Minh Le
(74) *Attorney, Agent, or Firm* — Greenblum & Bernstein, P.L.C.

(57) ABSTRACT

A network failover apparatus and method for use in a client-server system. The method includes establishing at least a first and further path between a client and a server. The first path connects the server to the client through a first network and a first interface of the client and the further path connects the server to the client through a further network that is separate from the first network and a further interface of the client. The method also includes reaching the server through the first interface, detecting that the server is no longer reachable through the first interface, and identifying the first interface as failed. The method also includes reaching the server through the further interface after the first interface is identified as failed, testing the first interface to determine whether the server is reachable while the server is reachable through the further interface, and reestablishing a connection to the server through the first interface.

29 Claims, 4 Drawing Sheets

COMMUNICATIONS PATH STATUS DETECTION SYSTEM

CROSS-REFERENCE TO RELATED APPLICATIONS

This application claims the benefit of U.S. Provisional Application No. 61/051,267 filed May 7, 2008, the disclosure of which is expressly incorporated by reference herein in its entirety.

BACKGROUND OF THE INVENTION

1. Field of the Invention

The present invention relates to the field of communications. More particularly, the present invention relates to an apparatus, process and program for detecting a status of one or more communications paths in a networked computer system.

2. Discussion of Background Information

Traditionally, in Internet Mobility Protocol (IMP) bound to Internet Protocol (IP) address zero and port zero (e.g., INADDR_ANY), the stack would forward the frames from an interface of its choosing and receive frames on all interfaces. Address selection was essentially accomplished by trying each address in turn until a response was received. Generally, the source address of the received frame was considered to be the correct address to communicate with the server. Static routes could be used to force selection of one interface over another in certain situations. The only opportunity to control which interface the IMP traffic flowed on was to use policy to make interface speed adjustments, to hide adapters from IMP, or to add static routes to force the stack to send IMP traffic from a specific interface. Such policy is described in U.S. Pat. Nos. 7,136,645 and 7,293,107, the disclosures of which are expressly incorporated by reference herein in their entireties.

Given specific configurations, IMP could survive downstream outages on otherwise active interfaces by going unreachable and selecting an alternate address, thereby forcing the use of an alternate interface. An advanced setting would then allow testing of the higher speed interface in case the downstream problem clears up. The drawback to this approach is the requirement that a host's topology must support a separate address routable over a specific interface to enable any of these benefits.

Internet Mobility Protocol (IMP) was limited to address selection to control the selected gateway. Given two interfaces and a static route that forces the selection of one slower interface over the other, IMP selects the address on the faster network. When the network on the faster interface remains connected to the stack but it no longer has communication to a working gateway, the gateway can be considered to have failed. Once unreachable during retransmission IMP will begin to try alternate server addresses to see if a different address will reach the server. When it detects a response from the server, it uses the source address of the server which matches one of the addresses in the address list and communication resumes. The presence of the static route through the slower interface causes IMP to bypass the interface attached to the failed gateway. Now, the problem becomes how to ever come back to the higher speed interface, which, according to the known art, can be accomplished by a periodic IMP pings to the server through the other (failed) server address. This ping is done on a configurable time interval. When the ping is responded to, IMP switches to this address and communications resumes over the faster interface.

This was a very easy way to accomplish some limited failover detection and recovery mostly built on existing IMP functionality. The main problem with this approach is that it requires the user to have one server address assigned to one particular network interface. This works in some cases where the high speed network is private and the lower speed network is public (or vice-versus). However, the requirement for this topology and static route makes the solution difficult or impossible to solve in some cases. It is noted that RFC 816 (Fault Isolation and Recovery) and RFC 1122 (Requirements for Internet Hosts-Communication Layers) describe the standards for determining a failed gateway, and the disclosures of these documents are expressly incorporated by reference herein in their entireties.

Mobility can be configured to allow the client to use a slower interface to reach the server when there is a downstream network problem on the faster interface, even if the faster interface is still reporting a valid IP address. This is especially useful for interfaces that are connected to the device via Ethernet. Because the Ethernet connection to the wireless radio is constantly available whether the radio has a connection or not, the client can be fooled into thinking it has a good network connection and not release its IP address.

The client can have at least two interfaces, in which each interface can be connected to a different server address, e.g., of a mobility management server. By way of example, one interface can be connected to the server's NAT/external address via a public carrier, and another interface can be connected to its actual internal IP address over a local LAN. Alternatively, two or more NATs could be used for the two interfaces through various public or private backhaul systems. When the server becomes unreachable over the faster interface the client tries to reach the server over all of its known addresses. A static routes or strong routing ensures that connection attempts to the server's external address will be routed over the wireless wide area network (WWAN), not the faster (now failed) interface. Thus, the client is able to switch interfaces when a downstream network problem occurs.

SUMMARY OF THE INVENTION

According to an aspect of the invention, a network failover apparatus for use in a virtual private network (VPN) includes a preferred interface couplable to a server through a first network, a further interface couplable to the server through a further network, and a failed preferred interface detector to identify the preferred interface as a failed interface when the server is not reachable through the preferred interface. The system also includes a device to establish connection to the server through the further interface when the preferred interface is identified as a failed interface, a device to test the identified failed interface to determine whether the server is reachable through the identified failed interface while the further interface is connected to the server, and a device to reestablish connection to the server through the preferred interface.

According to embodiments, the device interface list can be combined with centrally managed policy to establish a ranking order for every interface on the device. This ranking may be used to choose a most preferred interface, rather than simply using the ranking order that the mobile end system's network stack may define.

Embodiments of the invention are directed to a network failover apparatus for use in a client-server system. The apparatus includes a preferred interface couplable to a server through a first network and a further interface couplable to the server through a further network. A failed preferred interface detector identifies the preferred interface as a failed interface when the server is not reachable through the preferred interface. The apparatus also includes a device to establish connection to the server through the further interface when the preferred interface is identified as a failed interface, a device to test the identified failed interface to determine whether the server is reachable through the identified failed interface while the further interface is connected to the server, and a device to reestablish connection to the server through the preferred interface.

According to embodiments of the present invention, the failed preferred interface detector can include a device for monitoring a failed gateway time out period, whereby, when the server is unreachable for the failed gateway time out, the preferred gateway is marked as failed. The failed gateway time out can be configurable based upon reliability of its associated network.

In accordance with the embodiments, the apparatus may include an interface connectivity tester to test the connectivity of the further interface before the device to establish connection to the server establishes connection to the server through the further interface.

The apparatus can also include additional interfaces, in which each additional interface is associated with a respective network, so that the further interface and the additional interfaces are prioritized in an order after the preferred interface. Further, an interface connectivity tester may test the connectivity of the further interface and the additional interfaces. The interface connectivity tester may sequentially test the further interface and the additional interfaces in the prioritized order until connectivity of one of the further interface and the additional interfaces is confirmed. The device to establish connection to the server through the further interface when the preferred interface is identified as a failed interface may include a device to establish connection to the server through the one of the further interface and the additional interfaces with confirmed connectivity when the preferred interface is identified as a failed interface. Further, the apparatus may include a trigger device to actuate the device to test the identified failed interface to determine whether the server is reachable through the identified failed interface while the further interface is connected to the server. The trigger device can include a failed gateway retry period monitor that is actuated by the established connection to the server of the one of the further interface and the additional interfaces with connectivity confirmed. Moreover, the failed gateway retry period can be configurable based upon preferences for bandwidth usage versus speed of transition back to a more preferred network.

In accordance with further embodiments of the instant invention, the failed preferred interface detector to identify the preferred interface as a failed interface may include a device to selectively identify each interface as failed when the server is not reachable through the preferred interface and any of the further interface and the additional interfaces having priority over the one of the further interface and the additional interfaces. The apparatus can further include a trigger device to actuate the device to sequentially test the each selectively identified failed interface in the prioritized order to determine whether the server is reachable through one of the selectively identified failed interfaces while the further interface is connected to the server. Further, once the server is determined to be reachable through a first one of the selectively identified failed interfaces, the first one of the selectively identified failed interfaces and each selectively identified failed interface being lower in the prioritized order may no longer be marked as failed. When the first one of the selectively identified failed interfaces is not the preferred interface, the connection can be established to the server through the first one of the further interface and the additional interfaces no longer marked as failed.

Embodiments of the invention are directed to a network failover method for use in a client-server system. The method includes establishing at least a first and further path between a client and a server, so that the first path connects the server to the client through a first network and a first interface of the client and the further path connects the server to the client through a further network that is separate from the first network and a further interface of the client. The method also includes reaching the server through the first interface, detecting that the server is no longer reachable through the first interface, and identifying the first interface as failed, reaching the server through the further interface after the first interface is identified as failed, testing the first interface to determine whether the server is reachable while the server is reachable through the further interface, and reestablishing a connection to the server through the first interface.

According to embodiments, the detecting that the server is nolonger reachable through the first interface may include monitoring a failed gateway time out period, whereby, when the server is unreachable for the failed gateway time out, the first interface is marked as failed. Further, the failed gateway time out can be configurable to avoid excessive transitioning between interfaces.

In accordance with embodiments of the instant invention, the method can further include testing the connectivity of the further interface before reaching the server through the further interface.

Moreover, the client can include additional interfaces, in which each additional interface is associated with a respective network, and the method may further include prioritizing the further interface and the additional interfaces in a prioritized order after the first interface, and sequentially testing the further interface and the additional interfaces in the prioritized order until connectivity of one of the further interface and the additional interfaces is confirmed. Still further, the method can include establishing connection to the server through the one of the further interface and the additional interfaces with confirmed connectivity when the first interface is identified as a failed interface. The method may also include triggering the testing of the identified failed interface to determine whether the server is reachable through the identified failed interface while the further interface is connected to the server. The triggering can include monitoring a failed gateway retry period after the establishing of the connection to the server of the one of the further interface and the additional interfaces with connectivity confirmed. Also, the failed gateway retry period may be is configurable to control bandwidth usage into failed network.

In accordance with further embodiments, the method may also include selectively identifying each interface between, with regard to the prioritized order, the first interface and the one of the further interface and the additional interfaces as failed when server is not reachable through the first interface and any of the further interface and the additional interfaces having priority over the one of the further interface and the additional interfaces. The method can also include triggering sequential testing of each selectively identified failed interface in the prioritized order to determine whether the server is reachable through one of the selectively identified failed interfaces while the further interface is connected to the server. Further, once the server is determined to be reachable through a first one of the selectively identified failed interfaces, the method can further include unmarking the first one of the selectively identified failed interfaces and each selectively identified failed interface being lower in the prioritized order as failed. When the first one of the selectively identified failed interfaces is not a preferred interface, the method can include establishing the connection to the server through the first one of the further interface and the additional interfaces after unmarking the first one of the further interface and the additional interfaces as failed.

In accordance with still yet other embodiments of the present invention, method can include maintaining an ordered list of all interfaces on the mobile devices with a ranking. The ranking can be maintained by constant analysis of a network stack reported attributes of the interfaces combined with a centrally managed policy configuration. Further, the ranking may be utilized to prioritize the interfaces in a ranked list.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout the several views of the drawings.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
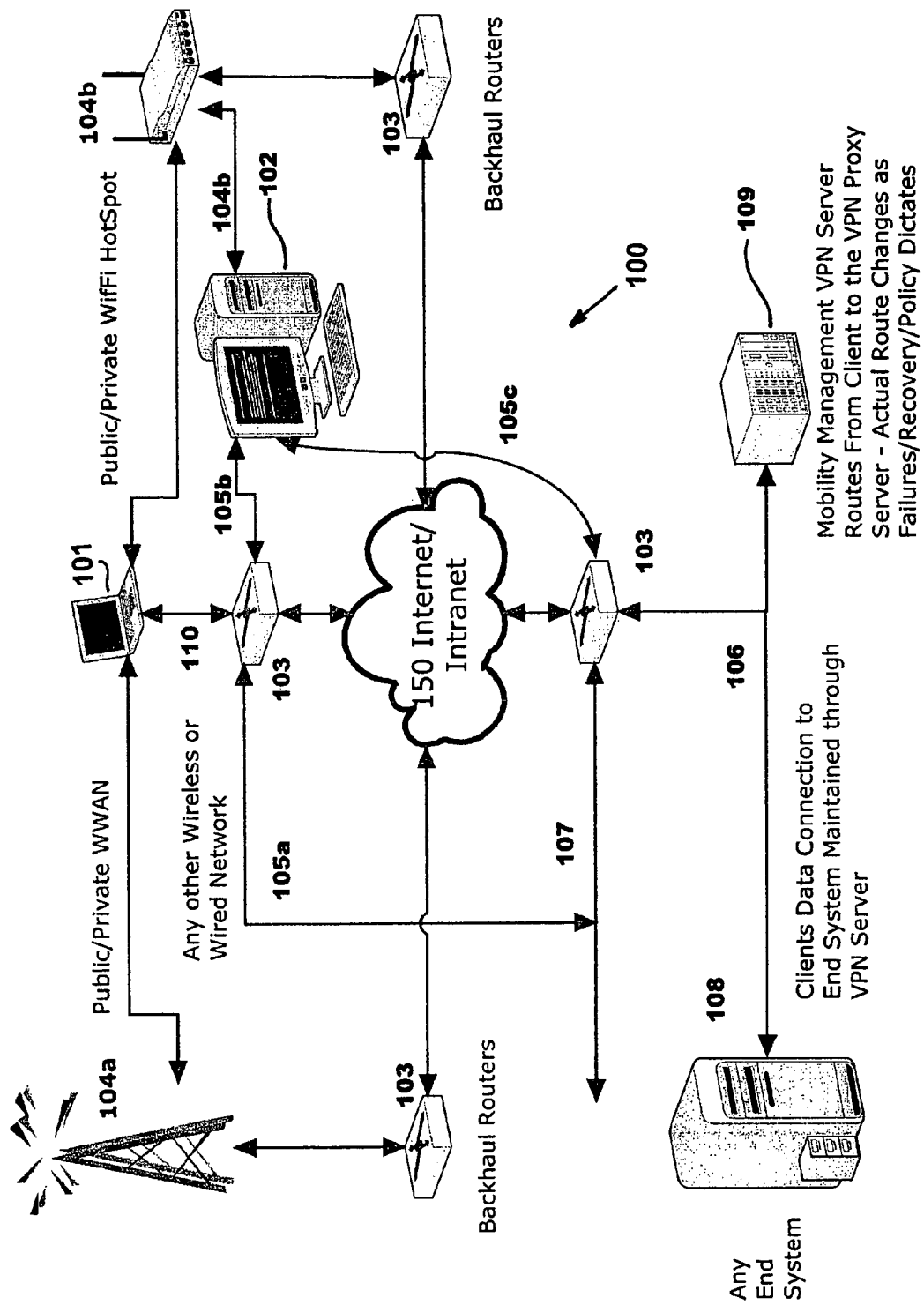
FIG. 1 illustrates an embodiment of a telecommunications system, according to an aspect of the present invention.

A non-limiting embodiment according to an aspect of the invention is shown in FIG. 1.

Referring to FIG. 1, a non-limiting embodiment of a communications system 100 is shown. The system 100 includes one or more Mobile End Systems (MES) 101, . . . that communicate within the system 100 via, radio frequency (RF) communication; one or more Stationed Mobile Ends Systems (SMES) 102; one or more connection devices 103, such as backhaul routers; one or more transceiver systems 104a, 104b, etc., such as an RF transmitter/receiver, a router, a cellular transmitter/receiver; a plurality of local area networks (LAN) 106 and 107; a Host System 108; a server, e.g., Mobility Management System (MMS) 109; a routing system; and a network 150. For the sake of clarity and ease of explanation, only a single device is illustrated for many of the elements depicted in FIG. 1. However, it is understood that in practice any number of the illustrated devices can be utilized to define the system and any number of the illustrated devices can be utilized within the system without departing from the spirit and scope of the embodiments of the invention.

Therefore, although a single MES 101 and a single SMES 102 is shown in FIG. 1, the skilled artisan will readily appreciate that these singular element depictions represent any number of these end devices, which may be interconnected within communication network 100. Further, the transceiver systems 104a, 104b, are merely non-limiting examples of various transceiver systems, but it is understood that the system can include multiple numbers of the illustrated transceiver systems, as well as other non-illustrated transceiver systems known in the art. Further, the transceivers 104a, 104b and the plurality of local area networks 106 and 107 may be configured to form parallel, autonomous, and dissimilar wireless networks, within which the MES 101 and other similar devices may seamlessly roam, while maintaining a persistent session.

The MES 101 can communicate with MMS 109 via the LAN 106. The MES 101 has or is connectable to a number of interfaces for reaching MMS 109 through a public/private wireless wide area network via transceiver 104a, through a public/private WiFi hotspot via transceiver 104b, through the any other wireless or wired networks 105a, or any other suitable network linked to the LAN 106. Moreover, the MES 101 and/or SMES 102 may be further linked by any other wireless or non-wireless networks 105a-105c through, for example, the connection device 103 and wired or wireless connection line 110.

The MESs 101 and/or the SMESs 102 may be any device or combination of devices capable of communication, including, but not limited to, e.g., any one of, or combination of a cellular telephone device, a personal data assistant (PDA), a personal music device (PMD), a personal identification device, a motion and/or still image pickup device, a hand held computer device, a software defined radio, a vehicle mounted computer device, a desktop computer device, a workstation, a server, a router, and the like. Moreover, any number of MESs may wirelessly communicate with any one or more of the transceiver devices 104a, 104b, without departing from the scope and/or spirit of the invention, as the skilled artisan will readily appreciate.

Further, the MESs may be standard mobile devices and/or off the shelf computers. For example, the MESs 101 and SMESs 102 may comprise a notebook computer equipped with a conventional radio transceiver and/or network cards available from a number of manufacturers, or a reconfigurable software defined radio. MESs 101 and SMESs 102 may run standard network applications and a standard operating system, and communicate on the transport layer using a conventionally available suite of transport level protocols (e.g., TCP/IP suite), or communicate on the data link layer. In accordance with a presently preferred exemplary embodiment of the present invention, MESs 101 and SMESs 102 also execute client software that enables them to communicate with MMS 109.

In the preferred exemplary non-limiting implementation, MMS 109 communicates with the MESs 101, or the SMESs 102, using Remote Procedure Call (RPC) and Internet Mobility Protocols (IMP) that are transported using the same such standard transport level protocols in accordance with a presently preferred implementation.

The transceiver systems 104a, 104b, which communicate wirelessly with the MESs 101, are each coupled to a local area network (LAN) 106 via a connector 103, such as a backhaul connector.

The transceiver systems 104a, 104b are responsible for sending and receiving, e.g., RF transmissions. The transceiver systems 104a, 104b facilitate communication, e.g., between the MESs 101 and, e.g., the MMS 109, the host system 108, the SMESs 102; and/or a Network 150.

U.S. Pat. No. 6,418,324 to Doviak et al., discloses an apparatus and method for transparent wireless communication between a remote device and host system that provides for, inter alia, communication over one or more parallel, dissimilar, and autonomous wireless networks, the entire disclosure of which is herein incorporated by reference. The end systems may seamlessly roam and communicate over any one of various coverage areas within the system, provided by the transceiver systems in a manner described with regard to, but not limited to, for example, FIGS. 29-32 and the corresponding text in the specification of the U.S. Pat. No. 6,418,324.

Further U.S. Pat. No. 6,546,425 to Hanson et al., discloses a method and apparatus for providing mobile and other intermittent connectivity in a computing environment, the entire disclosure of which is incorporated herein by reference. The end systems may seamlessly roam and communicate over any one of, or combination of the transceiver systems, in a manner similar to that described with regard to, but not limited to, for example, the end systems in FIG. 1, as well as the corresponding text in the specification of the U.S. Pat. No. 6,546,425.

MESs 101 are sometimes, but not always, actively connected to a server, e.g., MMS 109. For example, the MES 101 may communicate with MMS 109 via, e.g., transceiver system 104a coupled to the wire-based LAN 106 via Internet/intranet 150. Such a mobile interconnect may allow MES 101 to seamlessly roam from one coverage area to another coverage area, despite the connection to the MES 101 being intermittent and unreliable.

Typically, there is a temporary loss of communications when an MES 101 roams from one coverage area to another, moves out of range of the closest transceiver (such as, e.g., the transceiver system 104a), or has its signal temporarily obstructed (such as, e.g., when temporarily moved behind a building column, into a tunnel, or the like). Other MESs may communicate with the MMS 109 via a non-permanent wire-based interconnection system, such as, for example, docking ports, network cable connectors, or the like. There may be a temporary loss of communications when the MESs 101 are temporarily disconnected from, e.g., the LANs 106 by breaking a connection, powering off the MESs, etc. Still other MESs may be nomadically coupled to the MMS 109 via a further network topography such as, e.g., a wide area network, a dial-up network, a satellite network, or the Internet. In the exemplary embodiment, network 150 may provide intermittent service. In another example, MESs 101 may move from one type of connection to another (e.g., from being connected to the MMS 109 via a wire-based interconnection system, to being connected via network 150, or vice versa)—its connection being temporarily broken during the time it is being moved from one connection to another.

The MMS 109 may comprise software hosted by a conventional Windows NT, Windows Vista, or other server. In the preferred embodiment, MMS 109 is a standards-compliant, client-server based intelligent server that transparently extends the enterprise network LAN 106 to a nomadic environment. The MMS 109 serves as a network-level proxy for each of the MESs, by maintaining the state of each MES, and by handling the complex session management required to maintain persistent connections to any peer system, such as, for example, the Host 108, that host network applications, despite the mobile interconnections between the MESs and one or more of the transceiver systems 104a, 104b being intermittent and unreliable.

For example, the MMS 109 allows any conventional (e.g., TCP/IP based) network application to operate, without modification, over a mobile connection. The MMS 109 maintains the sessions of one or more MESs 101 and SMESs 102 that disconnect, go out of range or suspend operation, and resumes the sessions when the MESs return to service. When the MES 101, for example, becomes unreachable, shuts down or changes its point of presence address, the MMS 109 maintains the connection to the peer system (such as, e.g., Host System 108), by acknowledging receipt of data and queuing requests until the MES 101 once again becomes available and reachable.

The MMS 109 also extends the management capabilities of wired networks to mobile connections. Each network software layer operates independently of others, so the solution can be customized to the environment where it is deployed.

In accordance with an aspect of a presently preferred exemplary embodiment of the present invention, the MESs 101 and SMESs 102 communicate with the MMS 109 using conventional transport protocols such as, for example, TCP/IP, UDP/IP, or the like. Use of conventional transport protocols allows MESs 101 and SMESs 102 to communicate with the MMS 109 using, e.g., conventional backbone networks 150, existing routing systems, and other infrastructure already existing on an organization's network, such as, e.g., LAN 106 or 107.

A higher-level Remote Procedure Call (RPC) protocol generates transactions into messages that are sent over, e.g., the mobile networks LAN 106, via the standard transport protocol(s). In this preferred embodiment, these mobile RPC messages contain the entire network transaction initiated by an application running on, e.g., the MES 101, so it can be completed in its entirety by the MMS 109. This enables the MMS 109 and the MES 101 to keep connection state information synchronized at all times, even during interruptions of network medium connectivity.

FIG. 1 shows an exemplary illustration of a communication between an end system, e.g., MES 101, as a source device, and a server, e.g., MMS 109, as a destination device through communications system 100. MES 101 may include a router 103, such as a backhaul router or other known router formed, e.g., by hardware, software or a combination thereof, or externally attach to several routers, that is/are selectively connectable to a number of interfaces within MES 101. As shown in the illustrated example, MMS 109 can have a Wi-Fi address reachable by MES 101 through a WiFi network via router 104b. A separate address could allow the MES to connect to the MMS 109 via an addresses that connects to the MMS 109 via the WWAN of transceiver 104a. Further, MES 101 can reach the MMS 109 through additional, alternative networks via additional, alternative interfaces 105a. As shown in FIG. 1, MES 101 can connect to the IP address of MMS 109 through an Internet network 150, or to other addresses through other wireless and wired networks 105a, e.g., wired, cellular, Bluetooth, etc., via appropriate interfaces on the MES 101. When an MES 101 reaches MMS 109 through a suitable interface and corresponding network, MES 101 gains access to the MMS 109 to establish a client-server relationship. By way of example, the MMS 109 can be a server that allows MES 101 to join and use a virtual private network (VPN). MMS 109 can connect to the Internet.

During communication between MES 101 and MMS 109, it is not uncommon for a communication pathway through which the communication is established to become mal-affected (such as, by experiencing high levels of noise, traffic congestion, etc.) or to cease functioning altogether.

While the following discussion is directed to MES 101 for ease of understanding, it is understood that this discussion is applicable to other end systems utilized in the system in accordance with the features of the present invention. MES 101 can include a device for testing and controlling the interfaces connectable to the telecommunications system, and more particularly, to the MMS 109. An interface manager can be responsible for maintaining the state of each interface on the device and caching settings between connections. While interface manager may not generally persist through reboots of the machine, such persistence can be achieved without departing from the spirit and scope of the invention. When not persistent, the interface manager may be a reference counted class created and destroyed with the control block for each session. Further, the interface manager can maintain a default interface to which all IMP traffic not specifically directed elsewhere will go.

With regard to the state diagrams illustrated in FIGS. 2-4 described hereinbelow, these state diagrams may be implemented in environments that enable a device interface list combined with a centrally managed policy to establish a ranking order for every interface on the device. By way of example, the state diagrams can be implemented in the environment of FIG. 1, e.g., to run on the server, in order to utilize the highest ranked interface of the attached device based on a monitoring of the states of the interfaces and the centrally managed policy.

The state diagrams may represent a high-level block diagram of the invention. The steps of the state diagram may be implemented and executed from either a server, in a client server relationship, or they may run on a user device with operative information conveyed to the user device. Moreover, the invention can be embodied entirely in hardware, entirely in software, or in a combination of hardware and software elements. In embodiments, software elements can include, e.g., firmware, resident software, microcode, etc.

Furthermore, the invention can take the form of a computer program product accessible from a computer-usable or computer-readable medium providing program code for use by or in connection with a computer or any instruction execution system. In this regard, a computer-usable or computer readable medium can include any device or apparatus structured to contain or store the program for use by or in connection with the instruction execution system, apparatus, or device, or on which at least a portion of the program code or software may at least temporarily reside during an execution of the temporarily residing at least a portion. The medium can be any tangible medium, including, but not limited to, electronic, magnetic, optical, electromagnetic, infrared, or semiconductor system (or apparatus or device). Further, examples of a computer-readable medium include a semiconductor or solid state memory, magnetic tape, a removable computer diskette, a random access memory (RAM), a read-only memory (ROM), a rigid magnetic disk, flash drive, and an optical disk. Current examples of optical disks include compact disk-read only memory (CD-ROM), compact disk-read/write (CD-R/W) and DVD. The computer program product and/or software can be implemented in the environment of FIG. 1.

Figure 2:
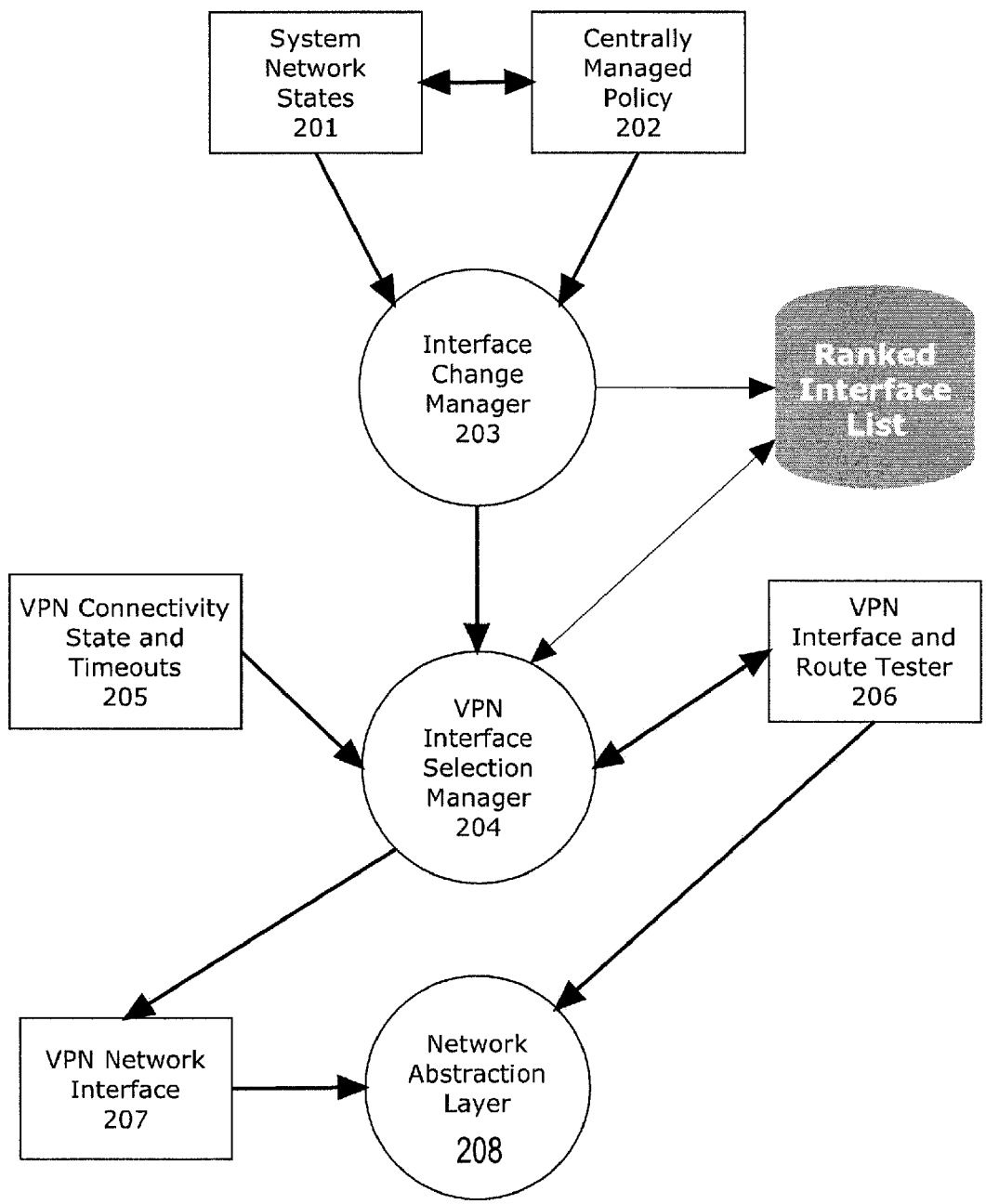
FIG. 2 illustrates a system diagram of a VPN interface selection/failover process according to the invention.

FIG. 2 illustrates an exemplary non-limiting system diagram of a general overview of virtual private network (VPN) interface selection/failover according to embodiments of the invention. It is noted that this state diagram is provided as a framework to explain the embodiments of the invention, and that this framework should not be understood or construed as being limited in any manner to any particular disclosed embodiment or procedure. At 201, the various states of a system network are determined, such that information is gathered about and from the user's system, including all notifications and changes, and component tracking the network state on the end system. Centrally managed policy at 202, which can, e.g., reside on the server, keeps track of configuration policy for the end system and combines that with the current state of the network determined from 201.

An interface change manager at 203 receives current state of the network data and the configuration policy to maintain an interface list. The interface list includes at least a ranked listing of interfaces and monitors the current state of the ranked interfaces. The interface change manager can tell a VPN interface selection manager of changes in the interface list, and can receive the ranked listing at 204. Additionally, VPN connectivity state and timeout information at 205 and VPN interface and route tester data 206 are also sent to the VPN interface selection manager.

The VPN connectivity state and timeout informs whether the VPN is currently reaching the server and when timeouts occur, and the VPN interface and route tester tests all interfaces and updates the states and rankings in the ranked list. In this way, the VPN interface selection manager gets interface change notifications, analyzing current state of ranked list, initiates tests, updates interface data after tests, and selects a current interface. Further, the VPN interface selection manager instructs the VPN network interface which interface to use at 207. At 208, a network abstraction layer is utilized by the VPN Network Interface layer to send and receive data so that sockets for the VPN can be opened and closed and new routes can be added as necessary based on bound interface addresses and send destination addresses.

The interface manager can initiate tests of the interfaces by creating instances of interface test classes that perform access tests for sets of addresses through specific interfaces. The interface manager can also accept requests from IMP via calls such as commands to test routing to the MMS, and responds to these requests by queuing work to the IMP thread. Moreover, the interface manager can maintain its network state by being a Mobility roaming subsystem subscriber.

The interface manager can be coupled to an interface tester, which can be a class implemented as a state machine pattern designed to test connectivity to the server through a set of interface's addresses. The code can use, e.g., echo-request/echo-response requests that can be modified to accept a specific local interface address. The tests can have duration parameters, and may be event driven by the use of timers and an IMP ping callback. It can also be reference counted and may refer to a requestor by IMP handle. In this manner, its lifetime is not bound to the invoking objects lifetime. Further, interface manager can utilize this class in testing interfaces.

The interface tester can be connected to a socket manager, which can be provided to manage open sockets on respective interfaces. In this manner, all socket operations can be performed on an IMP queue. Socket manager can be a global static singleton class that can maintain open sockets for IMP. Operations on the socket manager may all take place on the IMP thread, and logically, socket manager can behave in the way the traditional socket handling occurs. However, requests to open and/or reopen sockets can be registered and carried out when the IMP thread next runs. Further, socket requests can be referenced by an interface address from IMP, and IMP can instruct socket manager which socket is to be the default socket for the data sends. Through action of socket manager, IMP requests for server connectivity testing can be directed to specific interfaces or to the default. The default socket may always remain open, while all other sockets can be reference counted and closed when the reference count drops to zero. The server can use socket manager but it may support binding to inaddr_any as in the traditional manner and that can be the default socket.

The failover device can be simplified to use the interface tester for its testing of failover server availability. In contrast to current failover testing, failover code according to the invention for testing an address list may be removed up to the transition to success or failure. Further, cancel can be passed on to the specific interface tester instance, which should, overall, improve the maintainability of the failover code.

Further, the information obtained through the interface testing and controlling arrangement can be available to the user through a user interface, e.g., for displaying a state of interfaces, such as tests underway, when last tested or used, etc. under test, IMP diagnostics. The user interface can also identify the current network.

Within the end system, e.g., MES 10I, a network abstraction layer (NAL) can be provided to force all traffic out through the highest ranked interface with static routes. This behavior can be controlled by a parameter passed into the bind call. While this parameter has no effect on the server, on the client it can cause the route additions on XP/CE to force traffic out through the highest ranked interface. When the socket binds with this option, NAL can track sends and add static routes out the bound adapter for any destination sent to. It will do this in a global manner for all sockets that opened with this option.

Figure 3:
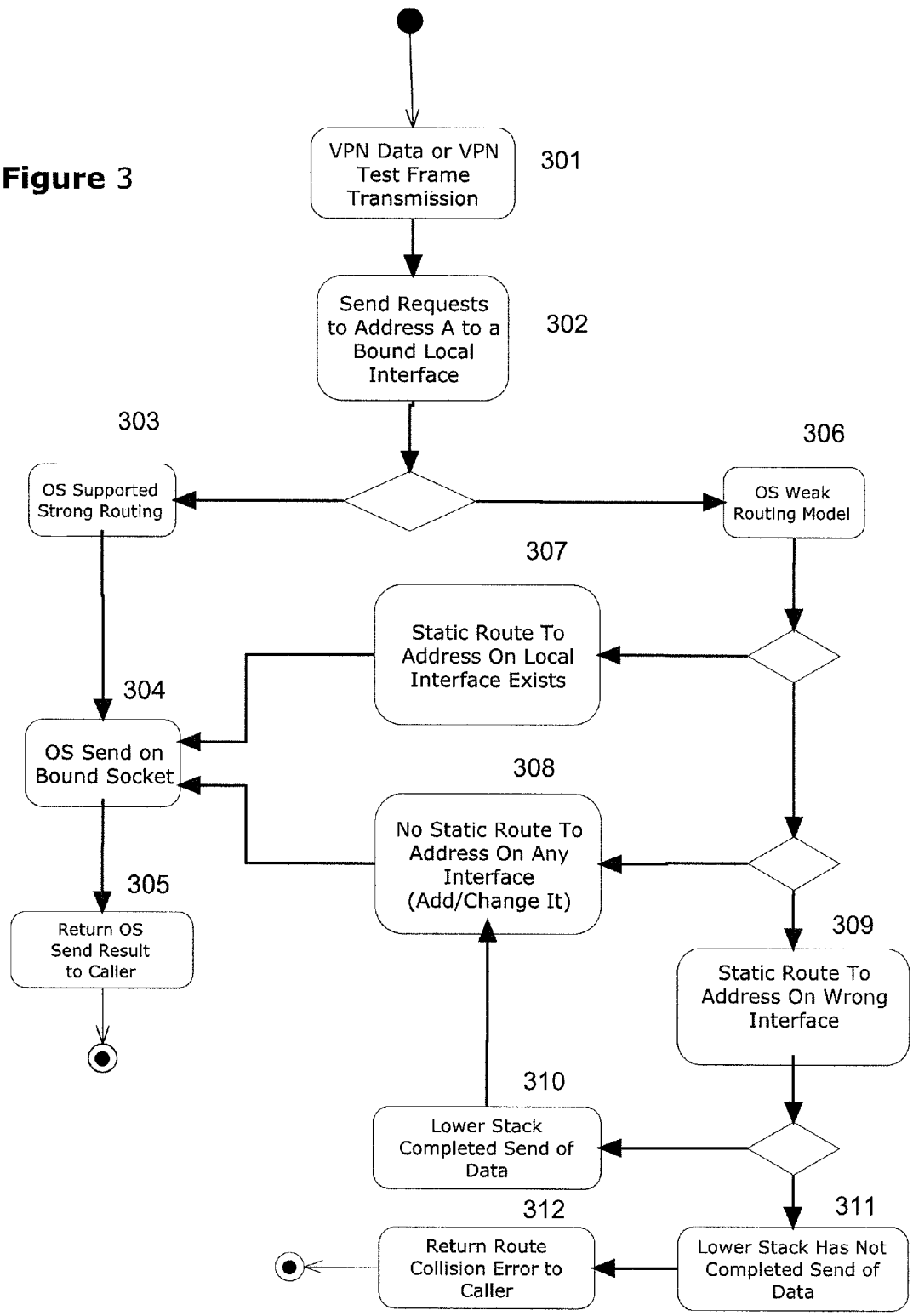
FIG. 3 illustrates system diagram of network abstraction layer virtual interface binding.

FIG. 3 illustrates a non-limiting exemplary state diagram of a network abstraction layer virtual interface binding method to create a socket on each interface and open it, and to make sure data goes over the specific interface. At 301, a VPN data fragment or a connectivity test frame is sent, and requests to an address "A" are sent to a bound local interface at 302. When the operating system supports strong routing at 303, the operating system transmits on the bound socket at 304. At 305, the operating system sends the result to the caller.

When the operating system at 306 is a weak routing model, the method proceeds to determine whether a static route exists. If a static route to the address exists on the local interface at 307, the operating system transmits on the bound socket at 304 and sends the result to the caller at 305. If no static routes to the address on any interface are found, a static route to the address can be added or changed at 308. Thereafter, the operating system transmits on the bound socket at 304, and sends the result to the caller at 305. When the static route to the address is on the wrong interface at 309, and the lower stack has completed the sending of data at 310, such that no conflicts exist, a static route to the address can be added or changed at 308. Thereafter, the operating system transmits on the bound socket at 304, and sends the result to the caller at 305. When the static route to the address is on the wrong interface at 309, and the lower stack has not completed the sending of data at 311, such that a conflicts exist, a return route collision error is sent to the caller at 312.

Embodiments of the invention can also include an exemplary process for setting up a network adapter of the end system with a number of interfaces. It should be understood that the process described is merely for ease of explanation and understanding and, therefore, should not be construed as limiting in any manner. A segment of a network adapter, e.g., a zero wire or wireless network adapter, can determine that a first IP interface (wired or wireless) is to be added to the device. A socket can be opened and the opened socket can be bound to the specific IP interface of the network adapter connected to the first network enabling mobility to send and receive mobility data over the first network. The process of binding to the first IP interface ensures mobility data is only sent or received over the first IP interface. A static route can be added to routing tables, e.g., the operating system's routing table, to the MMS. In this way, it may be ensured that the bound IP interface used for receiving mobility data is the only interface available for sending Mobility Data. If mobility data is available, transmission occurs only over the selected and bound IP Interface due to the static route and bind operation.

In accordance with embodiments of the invention, a second (and further) wireless adapter can be added to the device. A monitoring segment can determine whether a new or additional adapter has been added to the device that may require switching networks because it may be the preferred network. The socket for the current IP interface can be closed to disconnect the mobility software from the current IP interface and network, making the current network unable to receive or send mobility data. The static route previously added can be deleted from the routing table further disabling any subsequent or queued transmissions. Thus, communication with the server can be disrupted for a predefined period.

The new or additional IP interface can be selected for communications. A socket can be opened and the opened socket can be bound to the specific IP interface of the new selected network. Thus, the server can be connected only to the specific IP interface, which can enable the server to send and receive mobility data only over the newly selected IP interface. The process of binding to the newly selected IP interface ensures data is received only over the newly selected IP interface.

According to embodiments, a static route to the mobility server may be added to the routing table, e.g., the operating system's routing table, to make the newly selected IP interface (and its associated network) the only available IP interface for sending mobility data. At the same time, another interface available for testing a separate server address. An interface change notification can be sent to the server, and if unacknowledged mobility data has been submitted to the server, then the next piece of mobility data may be dropped. If no unacknowledged mobility data was submitted to the server or following the dropping of the next piece of mobility data, the process can return to determine whether an additional interface is to be added. If not, the process can end. Therefore, transmission of mobility data may now occur only over the newly selected IP interface and associated network due to the static route added and the bind operation.

For each destination, NAL may maintain the current local address the destination is bound to with a reference count on the sends. When the send complete occurs, the reference count will go back down. In the event a destination address is sent using a different bound local address, it can check the reference count. If it is greater than zero, it may go ahead and move routes for the destination to the new local address. If the reference count is greater than zero it will return the error NAL_STATUS_ROUTE_COLLISION. The IMP senders can support getting this error back and may include random back off to retransmission logic. Under Vista, data sent out a bound interface appear to always go out the bound interface regardless of the state of the routing table (even if more specific routes exist out different interface). Thus, to IMP, the logic of the bound interfaces through NAL on Vista/W2k/XP/CE will all appear the same except on Vista NAL will never return NAL_STATUS_ROUTE_COLLISION.

This NAL modification according to the invention can allow IMP to bind to specific interfaces. It can have its default interfaced bound to one interface and then have other interfaces open for testing server connectivity. Moreover, while NAL can add routes as needed for IMP, it may establish the route to be out through one interface for all addresses IMP sends on. In this way, IMP may be given static routes to the server using any address through the current stack selected interface. The interface selected can be, e.g., the one that the stack would select based on route table (lowest metric) or perhaps interface speed overridden by policy when there are two default gateways.

In accordance with another aspect of the invention, if NAL determines the IMP traffic should go out through a different interface, e.g., due to an interface change or metric/route table change, NAL can add the new route to the server through the new interface while the current route remains connected to the server through the current interface. In this way, both interfaces can be connected to reach the server, before the current interface is closed and all data is sent through the new interface, whereby no retransmit of data may be necessary.

Therefore, with operating systems that support a strong routing model at the IP network layer, the selection and use of the interface can be done by binding to specific interfaces. That may be done both for the default interface, which can be used, e.g., as a main VPN communication channel, as well as for tests using other interfaces. For operating systems that only support the weak routing model, static network routes may be added and removed to control the interface used in communication for each server address and local interface used. In order to insure test transmissions or the IMP data frames are actually making it out of the system, the routes may be held stable for the address/interface pair used until there is an indication from the underlying stack that the frame's IO has been completed. When a new send to an address/interface pair would result into a conflict with an uncompleted send operation, the send is failed with an error indicating a route collision has prevented the frame from being sent and the normal retransmission or random back off is employed and operation is retried after a delay. In this way, the logic of interface control and connectivity tests operate in a similar fashion regardless of the routing model used by client's host operating system.

Referring again to FIG. 1, MES 101 may generally be configured to use a preferred communications interface (or, a preferred plurality of communications interfaces) to reach MMS 109. The priority or preferred interface(s) for reaching MMS 109 can be generated by MMS 109 and sent to MES 101 to, e.g., populate an interface priority table to be utilized by MES 101. In this manner, should communication become impaired over the preferred communications interface(s) (such as, e.g., failing to provide a complete end-to-end connection to a virtual private network (VPN) server for any reason), whereby MMS becomes unreachable, MES may employ a derivative path selection (DPS) process to select a less preferred communications interface (or, a less preferred plurality of communications interfaces) in order to maintain its connection to the MMS 109.

The DPS process functions as an interaction of several systems, including interface status and prioritization, Internet Mobility Protocol (IMP) and interface selection, and testing for alternate interfaces and server address pairs for access to the server.

The communication layer may be provided with a continuously updated ordered list of adapters that defines a preferred network interface order. Policy information and device information can be merged to establish any order of interfaces and to control interface order. Further, the invention utilizes policy to hide interfaces, select a preferred interface, and to combine with logic to derive a list of interfaces. The order of the interfaces is not simply an order of fastest to slowest (although it can be), but is preferably a combination of device reported information about the interface in combination with centrally managed policy to control individual interfaces. In this manner, the ordered list and policy can combine to enable selection of the best interface and the best working interface. However, it is understood that this listing can utilize any manner understandable by the device or end system for identifying the preferred order for the applicable interfaces of MES 101. Status changes for the interfaces can be obtained through some or all of the following methods:
1. Client host operating system calls to monitor interface state changes,
2. Client host operating system calls to monitor wireless network interface state changes, and
3. DHCP based methods for determining network changes even when not detected by the host client operating system.

The types of status indications vary by client operating system and may often be improved over time. The status of the client's network interfaces is combined with the current server provided policy that can control the order of the interfaces. Specifically, policy can provide TCP route table changes, network interface speed overrides, and a setting that can make an interface unavailable for the client's VPN communications. These policies can be triggered by many states such as the name of the interface, the name of the wireless basic service set identifier (BSS/D), or the address/mask of the interfaces' IP address. From the merging of the policies with the current client's network status, the interfaces can be ranked according to a predefined parameter of interest, such as speed. In this regard, the fastest may be listed first according to actual speed and/or the prioritizing or ranking of the interfaces can be modified by policy. Interfaces that provide default gateways on the client can be ranked higher than those that are not default gateways. Further, this ordered list can be communicated to the communication sub-system (device) each time a network or policy change occurs.

Instead of simply using the interface determined by the network stack on the client's host operating system for the VPN communications, the communication system may attempt to establish and maintain its connection to the MMS through the preferred or highest priority or ranked interface, taking into account its current status.

According to embodiments of the invention, an exemplary interface selection logic may be implemented in environments that enable an end system to reach a server. By way of example, the invention can take the form of an entirely hardware embodiment, an entirely software embodiment or an embodiment containing both hardware and software elements. In an embodiment, the software elements include firmware, resident software, microcode, etc.

According to further embodiments, which can be initiated, e.g., at the start-up of the end system or when the end system has roamed from one network to another, an interface table established, e.g., through policy, can be accessed. By way of non-limiting example, the interface table can be resident within the end system. By way of example, the IMP can obtain the list of interfaces at startup and/or anytime roam messages indicate a change in the network layer has occurred effecting server connectivity, e.g., from roamQueryInterfaces. Thus, the structure related to each interface now has a rank member to allow IMP to know the order in which to prefer the interfaces. This ranking may be based on logic of ranking the preferred or default gateways and then any other routes to the server. At startup or each time a new best interface is reported from roam, IMP will select that interface and begin address selection. The preferred or default interface can be identified, e.g., through a pointer or other suitable manner, and the identified preferred or default interface can be marked as the "current" interface. The MES can then connect to the server through the current interface.

Once the server is accessed through the current interface/ network of the end system, it is possible that traffic may not actually be getting through to the server. When the communication layer determines an interface is not responding for longer than a configurable timeout to control excessive interface switching based on reliability of its associated network, e.g., 30 seconds, it may begin testing communication to the other known server addresses of the server over the remaining available interfaces. Moreover, this testing may preferably successively test the available interfaces in their priority order. When a lower priority, e.g., slower, interface responds and the lack of response from the current interface (and from higher priority interfaces, if applicable) has not ended, the current interface is marked as a failed interface and the interface selection logic is reevaluated. This will then cause the VPN traffic to transmit on the newly selected interface.

Figure 4:
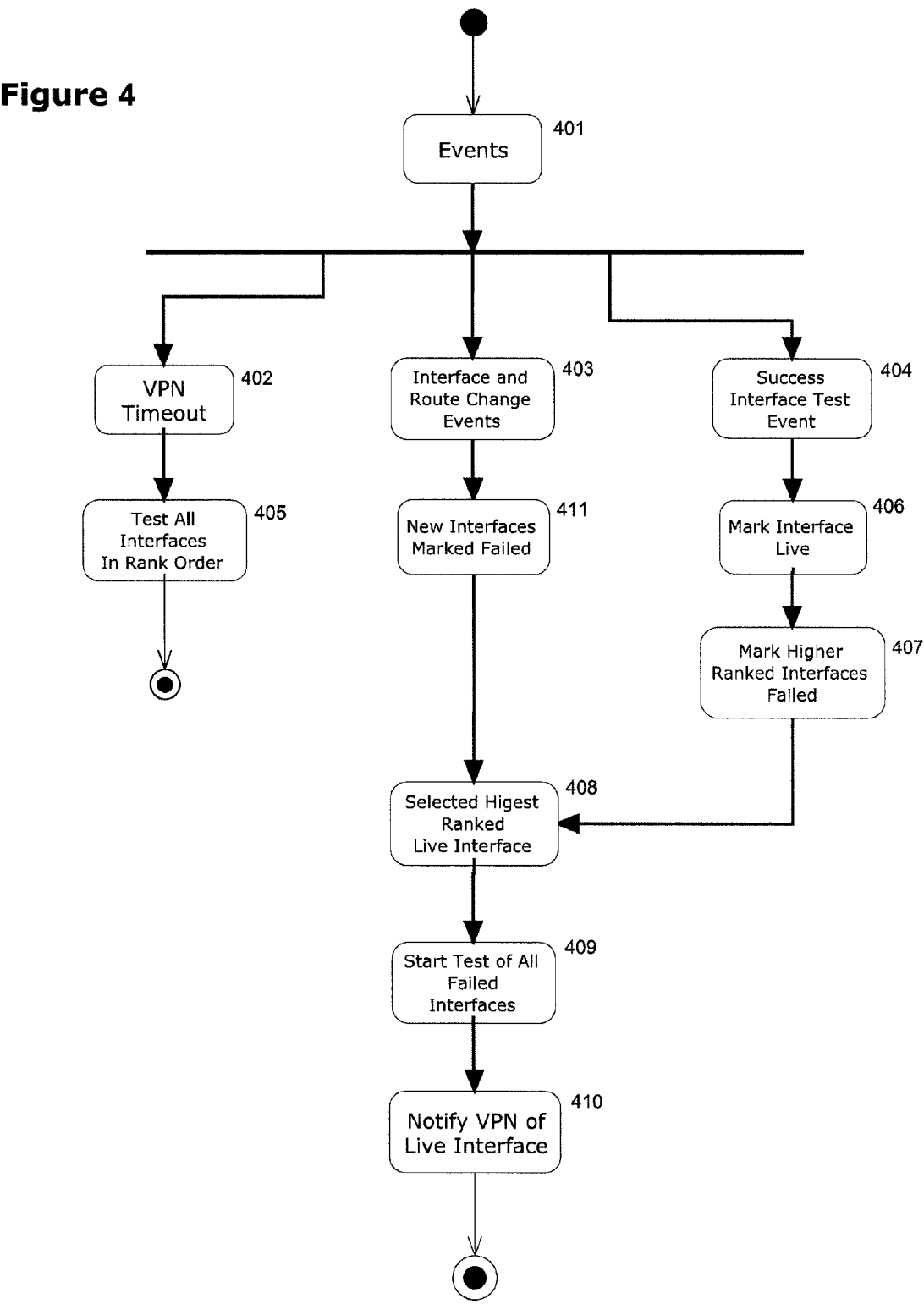
FIG. 4 illustrates a state diagram of a VPN interface selection manager.

A state diagram of a VPN interface selection manager, as described at 203 in FIG. 2, is shown in an exemplary non-limiting flow diagram illustrated in FIG. 4. The VPN interface selection manager is an event driven device. When a triggering event occurs at 401, e.g., a timeout 402, a successful test of an interface 403, or an interface or route change 404, the VPN interface selection manager is triggered.

At 401, a timeout, such as a VPN, gateway, or interface timeout, occurs. The timeout can be, e.g., 5 sec., 10 sec., 30 sec., or other time period suitable to establish that the server is not reachable over the interface. After timeout, all interfaces are tested at 405, preferably in rank order according to the ranked listing of interfaces.

After the occurrence of the event at 404, i.e., a successful interface test, the interface is appropriately marked at 406 to acknowledge the successful test, e.g., marking the interface as "live" or other suitable designation in the ranked listing. The interfaces ranked higher in the ranked listing of interfaces are also marked at 407 to identify these interfaces as "failed" or other suitable designation. At 408, the highest ranked interface in the ranked listing is selected at the "live" interface. After marking the interface "live," all higher ranked interfaces and interfaces marked as "failed" are tested at 409, and the VPN is notified at 410 of the selected "live" interface.

At 403, an event occurs in which a change occurs in the interface(s), e.g., a new interface is found. If a new interface is the triggering event, the new interface is marked at 411 as "failed." If the triggering event at 403 is another (not new) interface or route change, or after marking the new interface "failed," the highest ranked interface in the ranked listing is selected at the "live" interface at 408. After marking the interface "live," all higher ranked interfaces and interfaces marked as "failed" are tested at 409, and the VPN is notified at 410 of the selected "live" interface.

An exemplary method for testing available (non-preferred) interfaces, e.g., after a determination is made that the server is not reachable through the current (most preferred) interface can begin with a determination whether the server (e.g., MMS) is reachable over the current interface, which can be the default or most preferred interface. The determination of being unreachable can be based on a failed gateway time out, which is a predefined or configurable timeout of, e.g., 30 seconds, or, when in a heartbeat mode, i.e., when no data is being sent, for a longer period, such as a multiple of the heartbeat rate, e.g., every third frame can be acknowledged by the server. The elapsing of the above-noted failed gateway time out can be the trigger for testing the slower interfaces to find an interface that can reach the server. Therefore, if reachable through the current interface, the process can end or may return after waiting until the failed gateway time out elapses. When the server is unreachable, the interface table can be accessed, and the next highest priority interface may be identified, e.g., by setting a pointer to the next highest priority interface.

The identified interface is tested to determine whether the server is reachable through the interface. To test, a signal can be sent to the gateway or server and a response is awaited, i.e., the gateway or server can be tested (e.g., using IMP Echo/Request to test the VPN data path through the entire communications and VPN stack, a ping by ICMP Echo messages or other suitable connectivity testing). A successful test can indicate that the addressed interface and its associated machine are up. According to a particular embodiment, the state of the default interface, e.g., a VPN channel, can be determined by IMP retransmissions and/or echo-request/echo-response testing using VPN framing and ports, while the connectivity tests through the other interfaces can be performed with echo-request/echo-response with the same VPN framing and ports. The process can wait for a configurable time out period, e.g., 5 seconds, for a response from the IMP echo request. If a response is not received within the time out, a determination is made whether the interface is the last of the available interfaces. If the identified interface is the last listed (lowest priority) interface, then no other interface is better than the preferred interface, so the preferred interface remains the current interface, and the process may return to wait until the failed gateway time out elapses or until a successful test of a better (higher priority) interface completes. If the identified interface is not the last listed interface, the process can return to set the pointer to the next the interface and the process continues.

If the server is reachable through a lower priority tested interface, the current interface and all interfaces having priority over the identified interface may be marked "failed," the interface identified, e.g., by the pointer, may be marked as "current," and communication can be established with the server through the current interface.

Whenever a less preferred interface is in use, i.e., current, a test of the higher priority interfaces is initiated that will run until it detects a response on a higher priority interface in which case the interface's "failed" state is cleared and the interface selection logic is reevaluated. Such a test of the "failed" interfaces can be initiated or triggered after a configurable failed gateway retry period to control bandwidth usage into the failed network based upon a preference for bandwidth usage versus speed of transitioning back to a more preferred network, e.g., 10 sec. after communication has been established with the server through a slower interface. An exemplary flow diagram can be provided for testing interfaces marked as "failed."

The exemplary process can begin when communication is switched to be routed through a non-default interface marked as "current." After waiting the failed gateway retry period, e.g., 10 sec., the interface table can be accessed. The highest priority interfaced marked "failed" can be identified. The identified failed interface can be tested to determine whether the server is reachable through the identified (tested) interface. If not reachable, a determination can be made whether the tested interface is the last listed "failed" interface. If other "failed" interfaces are listed, the next highest priority "failed" interface may be identified, and the process can return to test the identified interface. If no other "failed" interfaces are listed, all failed interfaces can remain marked as failed, communication may continue through the current interface, and the process may return to retry the interfaces marked as "failed" after the failed gateway retry period has elapsed.

Thus, the testing of these interfaces at the configured frequency rate continues until a faster interface responds or until the faster interfaces no longer are connected with a valid interface address. In other words, each interface/address combination marked as "failed" is tested or retested. To determine whether the server is reachable through the interface, the process can wait, e.g., 5 seconds for a response from the test before trying the next address/interface combination.

The successful test events drive the interface selection. If the test determines that the server is reachable through the identified interface, the "failed" mark associated with the identified interface, and with each interface slower than the identified interface, can be removed. The identified interface is changed to "current," and communication can be established between the current interface and the server.

A determination is made whether the "current" interface is the default interface (ie highest ranked). If not the default, the process can return to retry the interfaces marked as "failed" after the failed gateway retry period has elapsed. If the current interface is the default, the process ends. The tester supports operations such as test all interfaces ranked lower than a specified one.

The above process describes the retesting of interfaces marked as "failed." It is noted that in addition to marking an interface "failed" after a test determines the server is not reachable through the interface, new interfaces found while the communication layer it is communicating successfully with the server can be initially marked as "failed." If this new interface tests positive for access to the server (just like any failed interface that regains access to the server), the interface failed status is cleared and the interface selection logic is reevaluated.

In the above-described flow diagrams, the current interface can be connected while the lower ranked/lower priority (or higher ranked/higher priority) interfaces are tested. In a particular embodiment of the invention, interfaces can be connected at the same time, and the end system can switch from the previous current interface to the new current interface. In this manner, the switching to the new interface can occur with little or no loss of data.

Further, the invention may be used in systems including, for example, a server-client relationship and/or peer-to-peer relationship. The invention may be used by service providers such as, for example, Internet service providers so as to ensure that a server or VPN are reachable by the user's end system.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein may be optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Accordingly, replacement standards and protocols having the same functions are considered equivalents.

What is claimed:

1. A network failover apparatus for use in a client-server system, comprising:

a preferred interface couplable to a server through a first network;

a further interface couplable to the server through a further network;

a failed preferred interface detector to identify the preferred interface as a failed interface when the server is not reachable through the preferred interface;

a device to establish connection to the server through the further interface when the preferred interface is identified as a failed interface;

a device to test the identified failed interface to determine whether the server is reachable through the identified failed interface while the further interface is connected to the server; and a device to reestablish connection to the server through the preferred interface.

2. The network failover apparatus in accordance with claim 1, wherein the failed preferred interface detector comprises a device for monitoring a failed gateway time out period, whereby, when the server is unreachable for the failed gateway time out, the preferred gateway is marked as failed.

3. The network failover apparatus in accordance with claim 2, wherein the failed gateway time out is configurable based upon reliability of its associated network.

4. The network failover apparatus in accordance with claim 1, further comprising an interface connectivity tester to test the connectivity of the further interface before the device to establish connection to the server establishes connection to the server through the further interface.

5. The network failover apparatus in accordance with claim 1, further comprising:

additional interfaces, in which each additional interface is associated with a respective network, wherein the further interface and the additional interfaces are prioritized in an order after the preferred interface; and an interface connectivity tester to test the connectivity of the further interface and the additional interfaces, wherein the interface connectivity tester sequentially tests the further interface and the additional interfaces in the prioritized order until connectivity of one of the further interface and the additional interfaces is confirmed.

6. The network failover apparatus in accordance with claim 5, wherein the device to establish connection to the server through the further interface when the preferred interface is identified as a failed interface comprises a device to establish connection to the server through the one of the further interface and the additional interfaces with confirmed connectivity when the preferred interface is identified as a failed interface.

7. The network failover apparatus in accordance with claim 6, further comprising a trigger device to actuate the device to test the identified failed interface to determine whether the server is reachable through the identified failed interface while the further interface is connected to the server.

8. The network failover apparatus in accordance with claim 7, wherein the trigger device comprises a failed gateway retry period monitor that is actuated by the established connection to the server of the one of the further interface and the additional interfaces with connectivity confirmed.

9. The network failover apparatus in accordance with claim 8, wherein the failed gateway retry period is configurable based upon preferences for bandwidth usage versus speed of transition back to a more preferred network.

10. The network failover apparatus in accordance with claim 6, wherein the failed preferred interface detector to identify the preferred interface as a failed interface comprises a device to selectively identify each interface as failed when the server is not reachable through the preferred interface and any of the further interface and the additional interfaces having priority over the one of the further interface and the additional interfaces.

11. The network failover apparatus in accordance with claim 10, further comprising a trigger device to actuate the device to sequentially test the each selectively identified failed interface in the prioritized order to determine whether the server is reachable through one of the selectively identified failed interfaces while the further interface is connected to the server.

12. The network failover apparatus in accordance with claim 11, wherein once the server is determined to be reachable through a first one of the selectively identified failed interfaces, the first one of the selectively identified failed interfaces and each selectively identified failed interface being lower in the prioritized order are no longer marked as failed.

13. The network failover apparatus in accordance with claim 12, wherein, when the first one of the selectively identified failed interfaces is not the preferred interface, the connection is established to the server through the first one of the further interface and the additional interfaces no longer marked as failed.

14. A network failover method for use in a client-server system, comprising:
establishing at least a first and further path between a client and a server, wherein the first path connects the server to the client through a first network and a first interface of the client and the further path connects the server to the client through a further network that is separate from the first network and a further interface of the client;
reaching the server through the first interface;
detecting that the server is no longer reachable through the first interface, and identifying the first interface as failed;
reaching the server through the further interface after the first interface is identified as failed;
testing the first interface to determine whether the server is reachable while the server is reachable through the further interface; and
reestablishing a connection to the server through the first interface.

15. The network failover method in accordance with claim 14, wherein the detecting that the server is no longer reachable through the first interface comprises monitoring a failed gateway time out period, whereby, when the server is unreachable for the failed gateway time out, the first interface is marked as failed.

16. The network failover method in accordance with claim 15, wherein the failed gateway time out is configurable to avoid excessive transitioning between interfaces.

17. The network failover method in accordance with claim 14, further comprising testing the connectivity of the further interface before reaching the server through the further interface.

18. The network failover method in accordance with claim 14, wherein the client includes additional interfaces, in which each additional interface is associated with a respective network, and the method further comprises:
prioritizing the further interface and the additional interfaces in a prioritized order after the first interface; and
sequentially testing the further interface and the additional interfaces in the prioritized order until connectivity of one of the further interface and the additional interfaces is confirmed.

19. The network failover method in accordance with claim 18, further comprising establishing connection to the server through the one of the further interface and the additional interfaces with confirmed connectivity when the first interface is identified as a failed interface.

20. The network failover method in accordance with claim 19, further comprising triggering the testing of the identified failed interface to determine whether the server is reachable through the identified failed interface while the further interface is connected to the server.

21. The network failover method in accordance with claim 20, wherein the triggering comprises monitoring a failed gateway retry period after the establishing of the connection to the server of the one of the further interface and the additional interfaces with connectivity confirmed.

22. The network failover method in accordance with claim 21, wherein the failed gateway retry period is configurable to control bandwidth usage into failed network.

23. The network failover method in accordance with claim 19, further comprising selectively identifying each interface between, with regard to the prioritized order, the first interface and the one of the further interface and the additional interfaces as failed when server is not reachable through the first interface and any of the further interface and the additional interfaces having priority over the one of the further interface and the additional interfaces.

24. The network failover method in accordance with claim 23, further comprising triggering sequential testing of each selectively identified failed interface in the prioritized order to determine whether the server is reachable through one of the selectively identified failed interfaces while the further interface is connected to the server.

25. The network failover method in accordance with claim 24, wherein once the server is determined to be reachable through a first one of the selectively identified failed interfaces, the method further comprises unmarking the first one of the selectively identified failed interfaces and each selectively identified failed interface being lower in the prioritized order as failed.

26. The network failover method in accordance with claim 25, wherein, when the first one of the selectively identified failed interfaces is not a preferred interface, the method further comprises establishing the connection to the server through the first one of the further interface and the additional interfaces after unmarking the first one of the further interface and the additional interfaces as failed.

27. The network failover method in claim 14, further comprising:
   maintaining an ordered list of all interfaces on the mobile devices with a ranking.

28. The network failover method in claim 27, wherein the ranking is maintained by constant analysis of a network stack reported attributes of the interfaces combined with a centrally managed policy configuration.

29. The network failover method in claim 27, wherein the ranking is utilized to prioritize the interfaces in a ranked list.

* * * * *

UNITED STATES PATENT AND TRADEMARK OFFICE
CERTIFICATE OF CORRECTION

| | | Page 1 of 1 |
|---|---|---|
| PATENT NO. | : 8,122,283 B2 | |
| APPLICATION NO. | : 12/437413 | |
| DATED | : February 21, 2012 | |
| INVENTOR(S) | : E. Olson et al. | |

It is certified that error appears in the above-identified patent and that said Letters Patent is hereby corrected as shown below:

On the Title Page Item [60] of the printed patent, please add the following:

-- Related U.S. Application Data
This application claims benefit of U.S. Provisional Application 61/051,267 filed May 7, 2008 --

Signed and Sealed this
Sixteenth Day of October, 2012

David J. Kappos
*Director of the United States Patent and Trademark Office*